(12) United States Patent
Yang et al.

(10) Patent No.: US 8,841,913 B2
(45) Date of Patent: Sep. 23, 2014

(54) DETERMINING FORMATION PARAMETERS USING ELECTROMAGNETIC COUPLING COMPONENTS

(75) Inventors: Jian Yang, Sugar Land, TX (US); Qiming Li, Sugar Land, TX (US); Jean Seydoux, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 95 days.

(21) Appl. No.: 13/412,942

(22) Filed: Mar. 6, 2012

(65) Prior Publication Data

US 2012/0286790 A1 Nov. 15, 2012

Related U.S. Application Data

(63) Continuation of application No. 11/775,435, filed on Jul. 10, 2007, now Pat. No. 8,129,993.

(51) Int. Cl.
*G01V 3/10* (2006.01)
*G01V 3/28* (2006.01)

(52) U.S. Cl.
CPC .................................. *G01V 3/28* (2013.01)
USPC .................................. 324/343; 324/345

(58) Field of Classification Search
CPC ........................................... G01V 3/28
USPC ................................... 324/343, 345
See application file for complete search history.

(56) References Cited

U.S. PATENT DOCUMENTS

| 5,508,616 | A | 4/1996 | Sato et al. |
| 6,163,155 | A | 12/2000 | Bittar |
| 6,181,138 | B1 | 1/2001 | Hagiwara et al. |
| 6,297,639 | B1 | 10/2001 | Clark et al. |
| 6,351,127 | B1 | 2/2002 | Rosthal et al. |
| 6,476,609 | B1 | 11/2002 | Bittar |
| 6,566,881 | B2 | 5/2003 | Omeragic et al. |
| 6,969,994 | B2 | 11/2005 | Minerbo et al. |
| 6,998,844 | B2 | 2/2006 | Omeragic et al. |

(Continued)

FOREIGN PATENT DOCUMENTS

| FR | 2633971 A1 | 1/1990 |
| RU | 2069878 C1 | 11/1996 |

(Continued)

OTHER PUBLICATIONS

Office Action of Chinese Patent Application No. 20088023981.4 (24.0978-CN-PCT) dated Apr. 19, 2012.
"Double Electromagnetic and Lateral Logging", Methodical Handbook, Moscow, Nedra Russia, 1991; 58 pages.

(Continued)

*Primary Examiner* — Reena Aurora
(74) *Attorney, Agent, or Firm* — Kimberly Ballew

(57) ABSTRACT

A method and a downhole tool determine one or more parameters of a formation traversed by a borehole where at least a portion of the formation has substantially parallel boundaries. A tool is disposed in the borehole that includes a transmitter having a dipole moment at an angle $\theta_T$ with respect to a longitudinal axis of the tool, a receiver having a dipole moment at an angle $\theta_R$ with respect to the longitudinal axis of the tool and a rotational position indicator. The transmitter-receiver pair transmits an electromagnetic signal while rotating the tool, receives the electromagnetic signal to produce a measured signal, and determine(s) the formation parameters for the portion of the formation having substantially parallel boundaries based on the measured signal.

33 Claims, 2 Drawing Sheets

(56) References Cited

U.S. PATENT DOCUMENTS

| | | |
|---|---|---|
| 7,202,670 B2 * | 4/2007 | Omeragic et al. ............ 324/338 |
| 7,656,160 B2 | 2/2010 | Legendre et al. |
| 8,129,993 B2 * | 3/2012 | Yang et al. .................... 324/343 |
| 2003/0051914 A1 | 3/2003 | Bittar |
| 2009/0015261 A1 | 1/2009 | Yang et al. |

FOREIGN PATENT DOCUMENTS

| | | |
|---|---|---|
| RU | 2107313 C1 | 3/1998 |
| SU | 960701 A1 | 9/1982 |
| SU | 998995 A1 | 2/1983 |
| WO | 2009009342 A1 | 1/2009 |

OTHER PUBLICATIONS

Korolev, et al., "Electromagnetic Logging by a Lateral Magnetic Dipole, Perspectives of Electromagnetic Well Scanning", Geofizika Scientific-Production Co. Russia, 1995; 19 pages.

Machetin, et al., "TEMP—a New Dual-Electromagnetic and Laterology Apparatus—Tech. Complex", 13th European Formation Evaluation Sym. Trans., Budapest Ch. SPWLA, Paper K, 1990; 17 pages.

International Search Report & Written Opinion issued in PCT/US2008/068883 (24.0978-WO-PCT) on Jan. 12, 2010; 8 pages.

GB Examination Report under Section 18(3) issued in GB0922522.8 (24.0978-GB-PCT) on Jul. 11, 2011; 3 pages.

GCC Exam Report issued in GCC/P/2008/11267 (24.0978-GC-NP) on Jan. 20, 2012; 5 pages.

* cited by examiner

DETERMINING FORMATION PARAMETERS USING ELECTROMAGNETIC COUPLING COMPONENTS

This application claims priority as a continuation application of U.S. patent application Ser. No. 11/775,435, filed Jul. 10, 2007 (issued as U.S. Pat. No. 8,129,993). The disclosures of each of the priority applications are incorporated by reference herein in their entirety.

FIELD OF THE INVENTION

The present invention relates in general to well logging, and more particularly to techniques using one or more tilted transmitter-receiver pairs for improved electromagnetic measurements of subsurface formations.

BACKGROUND

Various well logging techniques are known in the field of hydrocarbon exploration and production. These techniques typically use tools equipped with sources adapted to emit energy into a subsurface formation that has been penetrated by a borehole. The emitted energy may interact with the surrounding formation to produce signals that may be detected and measured by one or more sensors. Based on the detected signal data, a profile of the formation properties (for example, resistivity as a function of wellbore depth) may be obtained.

Examples of well logging tools may include electromagnetic ("EM") resistivity tools, such as induction and propagation tools. The EM resistivity tools may be disposed within a borehole to measure the electrical conductivity (or its inverse, resistivity) of the formation surrounding the borehole. A conventional electromagnetic resistivity tool includes at least one transmitter and two receivers, each receiver being disposed some distance away from the transmitter along the axis of the tool. Conventional transmitters and receivers comprise antennas formed of coils having one or more turns of insulated conductive wire wound around a support. As is understood in the art, under the principle of reciprocity, each of those antennas can operate as a transmitter and/or a receiver.

EM induction tools measure the resistivity of the formation by measuring the voltage induced in a receiver by currents flowing in the formation in response to an EM signal emitted by a transmitter. In an induction tool, a transmitter coupled to an alternating current source, such as an oscillator, produces a time-varying EM signal. The EM signal from the transmitter is transmitted into the surrounding formation, which induces a fluctuating current or "eddy current" in the formation near the transmitter. The eddy current in the formation gives rise to a time-varying EM signal that induces an electrical voltage in the receiver. If a pair of spaced-apart receivers is used, the induced voltages in the two receivers will generally have different phases and amplitudes due to, for example, geometric spreading and absorption by the surrounding formation. EM propagation tools operate in a similar fashion, but typically at higher frequencies than EM induction tools.

In many conventional EM induction and propagation logging tools, the transmitter and receiver antennas are mounted with their axes along the longitudinal axis of the tool. Thus, these tools are implemented with antennas having longitudinal or axial magnetic dipole moments. A "transverse" antenna or coil has a magnetic dipole moment that is perpendicular to the tool axis, and a "tilted" antenna has a magnetic dipole moment that is neither parallel with nor perpendicular to the tool axis.

Because the EM signals transmitted and received by an EM resistivity tool pass through the surrounding formation, measurements made by such tools can provide information regarding the EM properties of the media through which the signals pass. Information such as distance to bed boundaries, formation dip, and anisotropy may be extracted from the received signals.

In the drilling industry there is an ever-increasing need for accurate well placement. Optimal placement of the borehole in the reservoir requires directional measurements on which steering decisions can be based. A further need in hydrocarbon exploration is to identify and characterize hydrocarbon reserves. For example, the formation anisotropy can be used to identify low resistivity pay residing in thinly laminated formations.

Many recent patents disclose methods and apparatus to make directional measurements and obtain resistivity anisotropy. For logging while drilling applications, U.S. Pat. No. 5,508,616 to Sato et al. discloses an induction-type tool with two coils tilted at different directions not aligned with the tool's longitudinal axis. The tool could be adapted for possible geosteering applications. The directionality of the measurement is illustrated through a simple argument that the sensitivity function of the two tilted coils is concentrated towards the overlapping region of the sensitivity area of each coil. Through rotation of the tool, Sato et al. claim that a deep azimuthal resistivity image of the formation can be obtained to help make steering decisions. However, this patent does not provide any details as to how the azimuthal resistivity can be obtained, nor does it describe any further boundary detection/characterization techniques required for quantitative geosteering decision-making.

U.S. Pat. No. 6,181,138 to Hagiwara and Song extends Sato et al.'s single fixed directional coils into co-located triple orthogonal induction coils at the transmitter and receiver locations. No tool rotation is said to be required, since the focusing direction can be tuned to arbitrary orientation through linear combination of the orthogonal coil responses.

U.S. Pat. No. 6,297,639 to Clark et al., assigned to the assignee of the present invention, discloses a method and apparatus for making directional measurements using various shield designs to provide selected attenuation of EM wave energy for axial, tilted, and transverse antenna coils. This patent describes, among other things, general directional induction and propagation measurements with tilted coils and appropriate shields, along with a process for conducting borehole compensation. A one transmitter and one receiver coil combination, at least one of them being tilted with respect to the tool axis, is explicitly described by Clark et al., along with its application for bed boundary direction detection by observing azimuthal variation of the induced signal as the tool rotates. The azimuthal variation of the coupling can be used for steering wells while drilling. Other shield patents have since been granted, including U.S. Pat. No. 6,351,127 to Rosthal et al., and U.S. Pat. No. 6,566,881 to Omeragic et al., both of which are assigned to the assignee of the present invention.

U.S. Pat. No. 6,476,609 to Bittar extends an earlier anisotropy patent (U.S. Pat. No. 6,163,155, also to Bittar) to the area of geosteering application. The bedding response of up/down tilted induction and propagation apparatus is described through the difference or ratio of signals at two different orientations, but no shielding is mentioned. Nor are the effects of anisotropy or dipping considered. Also lacking is a description of how to use these measurements to derive a precise distance to a formation bed boundary. The '609 patent implicitly assumes that bedding orientation is precisely known so as to calculate the up/down response. No technique, however, is disclosed to locate the precise up or down direction prior to the calculation of the up-down directional signals.

U.S. Pat. No. 6,969,994 to Minerbo et al., assigned to the assignee of the present invention, discloses tool configurations and symmetrization techniques that simplify the responses of the directional measurements to the point that they becomes almost independent of anisotropy or dip angle. Responses to bed boundaries having different dip and anisotropy essentially overlap except near the bed boundary. Both two-coil (one transmitter and one receiver: "TR") induction style and three-coil (one transmitter and two receivers: "TRR") propagation-style measurements can be symmetrized to achieve this simplification. The symmetrization is done using two tilted TR pairs of the same spacing, but with the transmitter tilt angle and receiver tilt angle exchanged.

U.S. Pat. No. 6,998,844 to Omeragic et al., also assigned to the assignee of the present invention, discloses propagation-style directional measurements for anisotropy determination in near-vertical wells with borehole compensation. Inversion techniques are also used to obtain the anisotropic formation property.

U.S. Pat. No. 7,202,670 to Li et al. discloses a method of extracting and analyzing the azimuthal dependence of directional logging measurements, using measurements taken at all azimuthal angles, to characterize the earth formation and for steering bottomhole drilling assemblies with improved accuracy. It teaches how to determine the bedding azimuth from the directional measurements, and generating measurements that can be used for well placement in up/down or azimuthal steering. It further teaches ways of utilizing these directional measurements in real-time to obtain bed boundary distances and to obtain accurate earth models such that geo-steering decisions can be made for well placement. It also discloses a method of detecting the presence of resistivity anisotropy in formation layers adjacent near-vertical wells. In addition, it teaches a method to obtain structure dip information from directional measurements in vertical and low angle wells.

As described above, EM induction tools measure the resistivity of the formation by measuring the voltage induced in a receiver by currents flowing in the formation in response to an EM signal emitted by a transmitter. In general, the induced voltage in a receiver is a linear combination of all the electromagnetic coupling components, $V_{ij}(i,j=x,y,z)$, forming a 3×3 EM coupling tensor. In a planar geometry formation in which all the relevant bedding boundaries are parallel, there are only five non-zero elements in the 3×3 EM coupling matrix, referred to as $V_{xx}$, $V_{yy}$, $V_{zz}$, $V_{xz}$, and $V_{zx}$. The coordinate system is chosen such that the z-axis is along the tool axis and the y-axis is parallel to the boundary plane. Since those EM coupling components measure the characteristics of the formation, it is desirable to have an apparatus and method to determine them.

A recent improvement in EM resistivity data analysis, disclosed in U.S. Pat. No. 6,969,994 to Minerbo et al. and U.S. Pat. No. 7,202,670 to Li et al., involves the superposition of measurements of two different transmitter-receiver ("TR") pairs to obtain symmetrized and anti-symmetrized responses. In one embodiment, one of the antennas of each TR pair is axial and the other is tilted. One TR pair provides the $V_{xz}$ electromagnetic coupling component, and the other TR pair provides the $V_{zx}$ electromagnetic coupling component. By adding or subtracting particular electromagnetic coupling components obtained from the two TR pair measurements, the symmetrized ($V_{xz}-V_{zx}$) and the anti-symmetrized ($V_{xz}+V_{zx}$) responses can be obtained. The symmetrized response is particularly useful for well placement in high-angle and horizontal wells. The anti-symmetrized response may be used to obtain dip and formation anisotropy. However, the above references require two different TR pairs. It is desirable to provide an apparatus and method to determine $V_{xz}$ and $V_{zx}$ using only one TR pair. It is also desirable to provide an apparatus and method to determine all five non-zero EM coupling components $V_{xx}$, $V_{yy}$, $V_{zz}$, $V_{xz}$, and $V_{zx}$ in a planar geometry formation using only two transmitters and one receiver.

SUMMARY OF THE INVENTION

A method to determine one or more parameters of a formation traversed by a borehole, at least a portion of the formation having substantially parallel boundaries, the method comprising disposing a tool in the borehole, wherein the tool includes a transmitter having a dipole moment at an angle $\theta_T$ with respect to a longitudinal axis of the tool and a receiver having a dipole moment at an angle $\theta_R$ with respect to the longitudinal axis of the tool, the transmitter and receiver comprising a transmitter-receiver pair; transmitting an electromagnetic signal while rotating the tool; receiving the electromagnetic signal to produce a measured signal from the transmitter-receiver pair; and determining the one or more formation parameters for the portion of the formation having substantially parallel boundaries based on the measured signal from the transmitter-receiver pair. A tool disposed in a borehole penetrating a formation, at least a portion of the formation having substantially parallel boundaries, the tool comprising a single transmitter having a transmitter dipole moment at an angle $\theta_T$ with respect to a longitudinal axis of the tool; a single receiver having a receiver dipole moment at an angle $\theta_R$ with respect to the longitudinal axis of the tool; and a rotational position indicator.

BRIEF DESCRIPTION OF THE DRAWINGS

The foregoing and other features and aspects of the present invention will be best understood with reference to the following detailed description when read in conjunction with the accompanying drawings, wherein.

DETAILED DESCRIPTION

Figure 1:
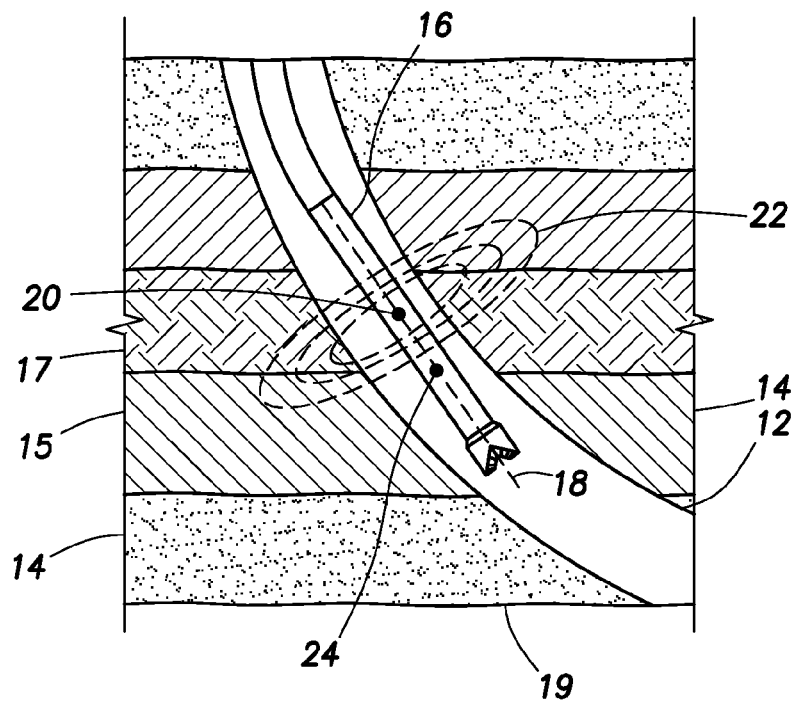
FIG. 1 is a schematic illustration of a logging operation in accordance with the present invention.

Refer now to the drawings wherein depicted elements are not necessarily shown to scale and wherein like or similar elements are designated by the same reference numeral through the several views.

As used herein, the terms "up" and "down"; "upper" and "lower"; and other like terms indicating relative positions to a given point or element are used to more clearly describe some elements of the embodiments of the invention. Commonly, these terms relate to a reference such that the surface from which drilling operations are initiated is the upper portion and the total depth of the well is the lower portion.

As used herein, the term "tool" may be used interchangeably to indicate, for example and without limitation, a wireline tool or a logging-while-drilling tool. One of ordinary skill in the art would know how to adapt a wireline tool, for example, to withstand and operate in the harsh environment of a logging-while-drilling tool. Although implementations of various technologies described herein are with reference to an induction tool and/or a propagation tool, it should be understood that some implementations may be used in other operations, such as logging-while-tripping, permanent monitoring, dielectric constant logging, and the like. Further, as used herein, any reference to conductivity may be intended to encompass its inverse, resistivity, or vice versa. Additionally, those skilled in the art will appreciate that the same antenna may be used as a transmitter at one time and as a receiver at another.

FIG. 1 is schematic drawing of a logging operation using one embodiment of the present invention to obtain parameters of the subsurface strata. A borehole or wellbore 12 is drilled penetrating subsurface strata 14, typically at an angle other than perpendicular to the strata 14. A particular stratum 15 may have an upper and lower boundary. The layer 17 just above the particular stratum 15 is generally referred to as the "upper shoulder" and the layer 19 just below is the "lower shoulder". Disposed within wellbore 12 is a tool 16 having a single transmitter-receiver (TR) pair of antennas, both antennas being tilted relative to the tool axis 18 of tool 16. Tool 16 may also carry the associated electronics and circuitry (not shown) necessary to operate the tool 16, but the invention is not limited to such. When energized, transmitter 20 transmits EM energy into the surrounding strata 14, which induces a current 22 (eddy current) in the strata 14 around transmitter 20. Eddy current 22 induces a voltage in receiver antenna 24. The angle $\phi_R$ between the tool axis 18 (which is substantially the same as the borehole axis) and the normal to the plane of a particular stratum such as stratum 15 is referred to as the relative dip of the formation or the bedding orientation angle.

Figure 2A:
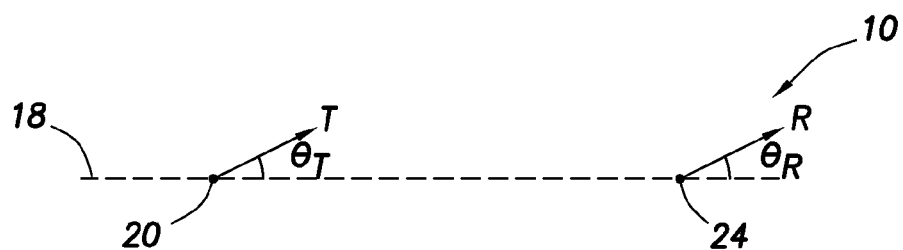
FIGS. 2A and 2B are schematic diagrams of exemplary configurations of a transmitter-receiver pair in accordance with the present invention.
Figure 2B:
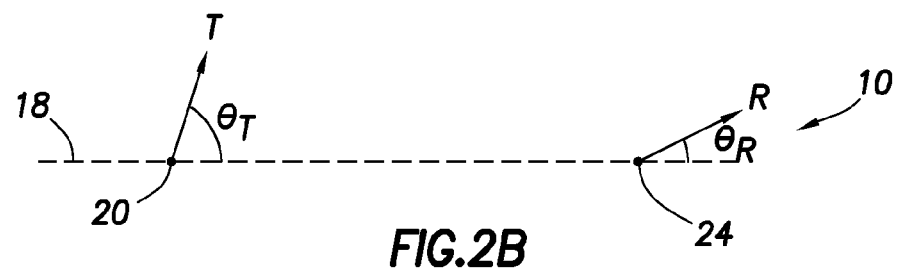
Figure 2C:
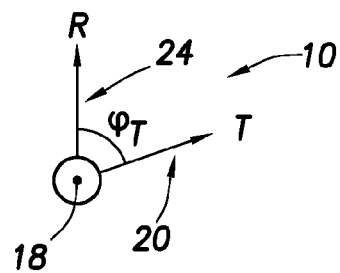
FIG. 2C is a schematic diagram of an end view of the exemplary configuration of FIG. 2A.

Certain implementations of the present invention described herein use the symmetrized and anti-symmetrized responses obtained from a single TR pair to provide directional measurements and anisotropy information. FIGS. 2A, 2B, and 2C illustrate particular configurations that may be used in that regard. In those figures, tool axis 18 is illustrated by a dashed line in side view and a dot in end view. Configuration 10 includes a tilted transmitter 20 and a tilted receiver 24, meaning the magnetic dipole moments of transmitter 20 and receiver 24 are neither parallel nor perpendicular to tool axis 18. Transmitter 20 and receiver 24 may be approximated as point magnetic dipoles. According to the present invention, the magnetic dipole moments of transmitter 20 and receiver 24 may be, but are not required to be in the same plane, and in some embodiments it is desired that the magnetic dipole moments of transmitter 20 and receiver 24 be in two non-parallel planes, such as in two orthogonal planes.

In FIG. 2A, the magnetic dipole moments of both transmitter 20 and receiver 24 are oriented at equal angles relative to tool axis 18. A preferred embodiment uses an orientation angle of forty-five degrees for both. The angle of the magnetic dipole moment of transmitter 20 is shown as $\theta_T$, and the angle of the magnetic dipole moment of receiver 24 is shown as $\theta_R$.

In other embodiments, such as that illustrated in FIG. 2B, $\theta_T$ and $\theta_R$ may be different from one another. When transmitter 20 is activated, the induced voltage at receiver 24 is measured. From the data obtained from the single tilted TR pair, the symmetric ($V_{xz} - V_{zx}$) and anti-symmetric ($V_{xz} + V_{zx}$) responses may be computed. Additional responses that are sensitive to formation parameters may also be computed. For example, the sum of the $V_{xx}$ and $V_{yy}$ couplings ($V_{xx} + V_{yy}$) may be sensitive to anisotropy. In general, the components of the coupling tensor can be used individually or in combination to infer formation properties such as horizontal and vertical resistivity and distance to bed boundaries, as is well known in the art.

Although the discussion below is focused on EM propagation tool measurements, it applies to EM induction tool measurements as well. The mathematical theory underlying the invention is now presented.

The voltage at receiver 24 induced by the EM signal transmitted from transmitter 20 can be written in terms of a Fourier series of azimuth angle $\phi$ up to the second order, where $\phi$ is the azimuth angle of receiver 24. The measured voltage at receiver 24 can be written as:

$$V_{RT}(\phi) = C_0 + C_{1c}\cos(\phi) + C_{1s}\sin(\phi) + C_{2c}\cos(2\phi) + C_{2s}\sin(2\phi). \quad (1)$$

This equation is expressed in a tool-based coordinate system in which the z-axis points downward along the tool axis 18 and the x-axis is directed along the projection of the negative of the gravity acceleration vector onto a plane perpendicular to tool axis 18. The y-axis completes the right-hand system. A set of complex coefficients $C_0$, $C_{1c}$, $C_{1s}$, $C_{2c}$, and $C_{2s}$ representing the $0^{th}$, $1^{st}$, and $2^{nd}$ order harmonic coefficients of the voltage are defined as:

$$C_0 = \begin{bmatrix} V_{zz}\cos(\theta_R)\cos(\theta_T) + \frac{1}{2}(V_{xx}+V_{yy})\sin(\theta_R)\sin(\theta_T)\cos(\phi_T) + \\ \frac{1}{2}(V_{xy}-V_{yx})\sin(\theta_R)\sin(\theta_T)\sin(\phi_T) \end{bmatrix}; \quad (2)$$

$$C_{1c} = V_{xz}\sin(\theta_R)\cos(\theta_T) + \\ V_{zx}\cos(\theta_R)\sin(\theta_T)\cos(\phi_T) + V_{zy}\cos(\theta_R)\sin(\theta_T)\sin(\phi_T); \quad (3)$$

$$C_{1s} = V_{yz}\sin(\theta_R)\cos(\theta_T) + \\ V_{zy}\cos(\theta_R)\sin(\theta_T)\cos(\phi_T) - V_{zx}\cos(\theta_R)\sin(\theta_T)\sin(\phi_T); \quad (4)$$

$$C_{2c} = \frac{1}{2}(V_{xx}-V_{yy})\sin(\theta_R)\sin(\theta_T)\cos(\phi_T) + \\ \frac{1}{2}(V_{xy}+V_{yx})\sin(\theta_R)\sin(\theta_T)\sin(\phi_T); \quad (5)$$

$$C_{2s} = \frac{1}{2}(V_{xy}+V_{yx})\sin(\theta_R)\sin(\theta_T)\cos(\phi_T) - \\ \frac{1}{2}(V_{xx}-V_{yy})\sin(\theta_R)\sin(\theta_T)\sin(\phi_T); \quad (6)$$

where $\theta_R$ and $\theta_T$ are the receiver and transmitter angles, respectively, with respect to the tool axis, and $\phi_T$ is the azimuth angle of transmitter 20 relative to receiver 24.

If the strata 14 are arranged in parallel layers such that the boundaries are parallel, a stratigraphic grouping known as a "planar formation", the tool-based coordinate system can be rotated about the z-axis such that the y-axis is parallel to the formation layers or bed boundaries. The x-axis will be in the plane formed by the tool axis and the norm of the bedding plane and perpendicular to the z-axis and the y-axis. The relevant bed boundaries are those detectable by the tool. In this rotated coordinate system the "y" cross-couplings, $V_{xy}$, $V_{yx}$, $V_{yz}$, and $V_{zy}$ are zero, and there are only five non-zero couplings. If the layers are only nearly parallel, a small error is introduced because those cross-coupling terms will no longer be zero. The present method can be used in such substantially parallel layers if the error introduced is within an acceptable limit. Therefore, if the cross-coupling terms are zero or nearly zero, the voltage equation can be simplified as:

$$V_{RT}(\phi) = \tilde{C}_0 + \tilde{C}_{1c}\cos(\phi - \phi_B) + \tilde{C}_{1s}\sin(\phi - \phi_B) + \tilde{C}_{2c}\cos(2(\phi - \phi_B)) + \tilde{C}_{2s}\sin(2(\phi - \phi_B)); \quad (7)$$

where $$\tilde{C}_0 = V_{zz}\cos(\theta_R)\cos(\theta_T) + \frac{1}{2}(V_{xx} + V_{yy})\sin(\theta_R)\sin(\theta_T)\cos(\phi_T); \quad (8)$$

$$\tilde{C}_{1c} = V_{xz}\sin(\theta_R)\cos(\theta_T) + V_{zx}\cos(\theta_R)\sin(\theta_T)\cos(\phi_T); \quad (9)$$

$$\tilde{C}_{1s} = -V_{zx}\cos(\theta_R)\sin(\theta_T)\sin(\phi_T); \quad (10)$$

$$\tilde{C}_{2c} = \frac{1}{2}(V_{xx} - V_{yy})\sin(\theta_R)\sin(\theta_T)\cos(\phi_T); \quad (11)$$

$$\tilde{C}_{2s} = -\frac{1}{2}(V_{xx} - V_{yy})\sin(\theta_R)\sin(\theta_T)\sin(\phi_T); \quad (12)$$

where $\phi_B$ is not only the rotation angle between the two coordinate systems, but also the azimuthal angle (relative dip) of the bed boundary. The above simplified equations can be rewritten as:

$$V_{RT}(\phi) = C_0 + C_{1c}\cos(\phi) + C_{1s}\sin(\phi) + C_{2c}\cos(2\phi) + C_{2s}\sin(2\phi); \quad (13)$$

where $$C_0 = V_{zz}\cos(\theta_R)\cos(\theta_T) + \frac{1}{2}(V_{xx} + V_{yy})\sin(\theta_R)\sin(\theta_T)\cos(\phi_T); \quad (14)$$

$$C_{1c} = V_{xz}\sin(\theta_R)\cos(\theta_T)\cos(\phi_B) + V_{zx}\cos(\theta_R)\sin(\theta_T)\cos(\phi_B - \phi_T); \quad (15)$$

$$C_{1s} = V_{xz}\sin(\theta_R)\cos(\theta_T)\sin(\phi_B) + V_{zx}\cos(\theta_R)\sin(\theta_T)\sin(\phi_B - \phi_T); \quad (16)$$

$$C_{2c} = \frac{1}{2}(V_{xx} - V_{yy})\sin(\theta_R)\sin(\theta_T)\cos(2\phi_B - \phi_T); \text{ and} \quad (17)$$

$$C_{2s} = \frac{1}{2}(V_{xx} - V_{yy})\sin(\theta_R)\sin(\theta_T)\sin(2\phi_B - \phi_T). \quad (18)$$

Note in Equations (14) to (18), although we use the same variables $V_{xx}$, $V_{yy}$, $V_{zz}$, $V_{xz}$, and $V_{zx}$ for the electromagnetic coupling components, they are defined in the rotated coordinate system, and are in general different from those used in Equations (2) to (6).

The two $2^{nd}$ order harmonic coefficient equations above can be solved to obtain the bedding orientation angle $\phi_B$ and the ($V_{xx} - V_{yy}$) coupling. This leads to:

$$\phi_B = \frac{1}{2}\left[\phi_T + \tan^{-1}\left(\frac{C_{2s}}{C_{2c}}\right)\right]; \text{ and} \quad (19)$$

$$V_{xx} - V_{yy} = 2\frac{C_{2c}\cos(2\phi_B - \phi_T) + C_{2s}\sin(2\phi_B - \phi_T)}{\sin(\theta_R)\sin(\theta_T)}. \quad (20)$$

One can use those results to solve the $1^{st}$ order harmonic coefficient equations to obtain $V_{xz}$ and $V_{zx}$ if transmitter 20 and receiver 24 are in different planes ($\phi_T \neq 0$). The solutions are:

$$V_{zx} = \frac{C_{1c}\sin(\phi_B) - C_{1s}\cos(\phi_B)}{\cos(\theta_R)\sin(\theta_T)\sin(\phi_T)}; \text{ and} \quad (21)$$

$$V_{xz} = -\frac{C_{1c}\sin(\phi_B - \phi_T) - C_{1s}\cos(\phi_B - \phi_T)}{\sin(\theta_R)\cos(\theta_T)\sin(\phi_T)}. \quad (22)$$

The symmetrized ($V_{xz} - V_{zx}$) and the anti-symmetrized ($V_{xz} + V_{zx}$) responses can then be generated from those solutions.

If, however, transmitter 20 and receiver 24 are in the same plane ($\phi_T = 0$), then the bedding orientation angle $\phi_B$ and the combination of $V_{xz}$ and $V_{zx}$ can be found as follows:

$$\phi_B = \tan^{-1}\left(\frac{C_{1s}}{C_{1c}}\right); \text{ and} \quad (23)$$

$$V_{xz}\sin(\theta_R)\cos(\theta_T) + V_{zx}\cos(\theta_R)\sin(\theta_T) = C_{1c}\cos(\phi_B) + C_{1s}\sin(\phi_B). \quad (24)$$

When $\theta_R = \theta_T$, the anti-symmetrized component ($V_{xz} + V_{zx}$) can be extracted. When $\theta_R = -\theta_T$, the symmetrized component ($V_{xz} - V_{zx}$) can be extracted.

When transmitter 20 and receiver 24 are in orthogonal planes, $\cos(\phi_T) = 0$ and thus the $0^{th}$ order harmonic coefficient is proportional to $V_{zz}$ such that:

$$C_0 = V_{zz}\cos(\theta_R)\cos(\theta_T). \quad (25)$$

Therefore, the symmetrized and anti-symmetrized measurements can be defined respectively as:

$$\frac{V_{zz} + V_{xz}}{V_{zz} - V_{xz}} \cdot \frac{V_{zz} - V_{zx}}{V_{zz} + V_{zx}}; \text{ and} \quad (26)$$

$$\frac{V_{zz} + V_{xz}}{V_{zz} - V_{xz}} \cdot \frac{V_{zz} + V_{zx}}{V_{zz} - V_{zx}} \quad (27)$$

A further response sensitive to the anisotropy of the formation can be generated in the form of:

$$\frac{V_{zz} - \lambda(V_{xx} - V_{yy})}{V_{zz} + \lambda(V_{xx} - V_{yy})}; \quad (28)$$

where $\lambda$ is a constant.

If transmitter 20 and receiver 24 are in different, but non-orthogonal planes, the $0^{th}$ order harmonic coefficient can yield only a linear combination of $V_{zz}$ and ($V_{xx} + V_{yy}$). The symmetrized and anti-symmetrized measurements can be defined respectively as:

$$\frac{V_{zz} + \lambda(V_{xx} + V_{yy}) + V_{xz}}{V_{zz} + \lambda(V_{xx} + V_{yy}) - V_{xz}} \cdot \frac{V_{zz} + \lambda(V_{xx} + V_{yy}) - V_{xz}}{V_{zz} + \lambda(V_{xx} + V_{yy}) + V_{xz}}; \text{ and} \quad (29)$$

$$\frac{V_{zz} + \lambda(V_{xx} + V_{yy}) + V_{xz}}{V_{zz} + \lambda(V_{xx} + V_{yy}) - V_{xz}} \cdot \frac{V_{zz} + \lambda(V_{xx} + V_{yy}) - V_{xz}}{V_{zz} + \lambda(V_{xx} + V_{yy}) - V_{xz}}. \quad (30)$$

A further response can also be defined in the form of:

$$\frac{V_{zz} + \lambda V_{xx}}{V_{zz} + \lambda V_{yy}}; \quad (31)$$

where $\lambda$ is a constant. This response is sensitive to anisotropy.

While the embodiment described above uses a single TR pair having both antennas tilted, the invention is not limited to that configuration. For example, one antenna of a TR pair may be axially aligned with tool axis 18 while the other antenna is tilted. In one such configuration, in which the transmitter is axially aligned, the orientation bedding angle $\phi_B$ and the $V_{zz}$ and $V_{xz}$ couplings are given by:

$$\phi_B = \tan^{-1}\left(\frac{C_{1s}}{C_{1c}}\right); \tag{32}$$

$$V_{xz} = \frac{C_{1c}\cos(\phi_B) + C_{1s}\sin(\phi_B)}{\sin(\theta_R)}; \text{ and} \tag{33}$$

$$V_{zz} = \frac{C_0}{\cos(\theta_R)} \tag{34}$$

If the transmitter is transverse (perpendicular) to tool axis 18 and the receiver is tilted, the couplings $V_{xx}$, $V_{yy}$, and $V_{zx}$, as well as the orientation bedding angle $\phi_B$ are given by:

$$\phi_B = \frac{1}{2}\left[\phi_T + \tan^{-1}\left(\frac{C_{2s}}{C_{2c}}\right)\right] = \phi_T + \tan^{-1}\left(\frac{C_{1s}}{C_{1c}}\right); \tag{35}$$

$$V_{xx} = \frac{C_0 + C_{2c}\cos(2\phi_B - \phi_T) + C_{2s}\sin(2\phi_B - \phi_T)}{\sin(\theta_R)}; \tag{36}$$

$$V_{yy} = \frac{C_0 - C_{2c}\cos(2\phi_B - \phi_T) - C_{2s}\sin(2\phi_B - \phi_T)}{\sin(\theta_R)}; \text{ and} \tag{37}$$

$$V_{zx} = \frac{C_{1c}\sin(\phi_B - \phi_T) + C_{1s}\cos(\phi_B - \phi_T)}{\cos(\theta_R)}; \tag{38}$$

Note the bedding orientation angle $\phi_B$ can be computed using either the first or second order harmonic coefficients and, by equating the two, the transmitter azimuth angle can be derived as:

$$\phi_T = \tan^{-1}\left(\frac{C_{2s}}{C_{2c}}\right) - 2\tan^{-1}\left(\frac{C_{1s}}{C_{1c}}\right) \tag{39}$$

Figure 3A:
FIG. 3A is a schematic diagram of an exemplary configuration of a transmitter and two receivers in accordance with the present invention.
Figure 3B:
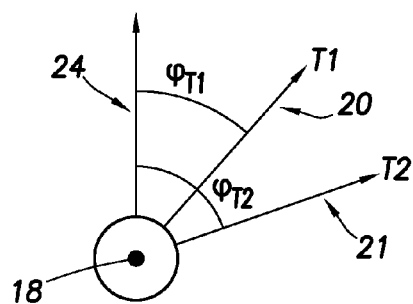
FIG. 3B is a schematic diagram of an end view of the exemplary configuration of FIG. 3A.

In another embodiment of the present invention, the gain-corrected electromagnetic coupling components can be obtained for a two transmitter-one receiver configuration, as shown in FIGS. 3A and 3B. In this embodiment, the two transmitters 20, 21 preferably operate at different times or at different (but preferably close) frequencies. They are closely located or preferably co-located. Assuming a planar formation and a rotated coordinate system as described above, Equations (7)-(24) may be extended and used.

Using Equations 19 and 20, the bedding orientation angle $\phi_B$ and the ($V_{xx}-V_{yy}$) coupling combination can be determined for the first transmitter-receiver pair:

$$\phi_B = \frac{1}{2}\left[\phi_T^{(1)} + \tan^{-1}\left(\frac{C_{2s}^{(1)}}{C_{2c}^{(1)}}\right)\right]; \text{ and} \tag{40}$$

$$V_{xx}^{(1)} - V_{yy}^{(1)} = 2\frac{C_{2c}^{(1)}\cos(2\phi_B - \phi_T^{(1)}) + C_{2s}^{(1)}\sin(2\phi_B - \phi_T^{(1)})}{\sin(\theta_R)\sin(\theta_T^{(1)})}. \tag{41}$$

The bedding orientation angle $\phi_B$ can also be computed using measurements from the second transmitter-receiver pair and averaged with the result from the first TR pair, if desired, or the value obtained from either TR pair may be used. The ($V_{xx}-V_{yy}$) coupling combination can also be determined for the second transmitter-receiver pair:

$$V_{xx}^{(2)} - V_{yy}^{(2)} = 2\frac{C_{2c}^{(2)}\cos(2\phi_B - \phi_T^{(2)}) + C_{2s}^{(2)}\sin(2\phi_B - \phi_T^{(2)})}{\sin(\theta_R)\sin(\theta_T^{(2)})}. \tag{42}$$

The gain correction of the second transmitter-receiver pair with respect to the first transmitter-receiver can be calculated as:

$$g_2 = \frac{V_{xx}^{(2)} - V_{yy}^{(2)}}{V_{xx}^{(1)} - V_{yy}^{(1)}} = \frac{[C_{2c}^{(2)}\cos(2\phi_B - \phi_T^{(2)}) + C_{2s}^{(2)}\sin(2\phi_B - \phi_T^{(2)})]\sin(\theta_T^{(1)})}{[C_{2c}^{(1)}\cos(2\phi_B - \phi_T^{(1)}) + C_{2s}^{(1)}\sin(2\phi_B - \phi_T^{(1)})]\sin(\theta_T^{(2)})}. \tag{43}$$

Similarly, Equations 21 and 22 can be used to solve the 1$^{st}$ order harmonic coefficient equations if the azimuth angles of the transmitters are not zero:

$$V_{zx}^{(j)} = \frac{C_{1c}^{(j)}\sin(\phi_B) - C_{1s}^{(j)}\cos(\phi_B)}{\cos(\theta_R)\sin(\theta_T^{(j)})\sin(\phi_T^{(j)})}; \tag{44}$$

$$V_{xz}^{(j)} = -\frac{C_{1c}^{(j)}\sin(\phi_B - \phi_T^{(j)}) - C_{1s}^{(j)}\cos(\phi_B - \phi_T^{(j)})}{\sin(\theta_R)\cos(\theta_T^{(j)})\sin(\phi_T^{(j)})} \tag{45}$$

where j=1 or 2. An average or a weighted average of the above component values from both transmitter-receiver pairs may be used to obtain more reliable results.

If the transmitter azimuth angles are not zero, the gain correction of the second transmitter-receiver pair with respect to the first transmitter-receiver for these coupling components can also be calculated as:

$$g_2 = \frac{V_{zx}^{(2)}}{V_{zx}^{(1)}} = \frac{[C_{1c}^{(2)}\sin(\phi_B) - C_{1s}^{(2)}\cos(\phi_B)]\sin(\theta_T^{(1)})\sin(\phi_T^{(1)})}{[C_{1c}^{(1)}\sin(\phi_B) - C_{1s}^{(1)}\cos(\phi_B)]\sin(\theta_T^{(2)})\sin(\phi_T^{(2)})}; \text{ or} \tag{46}$$

$$g_2 = \frac{V_{xz}^{(2)}}{V_{xz}^{(1)}} = \frac{[C_{1c}^{(2)}\sin(\phi_B - \phi_T^{(2)}) - C_{1s}^{(2)}\cos(\phi_B - \phi_T^{(2)})]\cos(\theta_T^{(1)})\sin(\phi_T^{(1)})}{[C_{1c}^{(1)}\sin(\phi_B - \phi_T^{(1)}) - C_{1s}^{(1)}\cos(\phi_B - \phi_T^{(1)})]\cos(\theta_T^{(2)})\sin(\phi_T^{(2)})}. \tag{47}$$

When the azimuth angles of the transmitters are zero, then the bedding orientation angle $\phi_B$ is found using Equation (23) and the coupling coefficients $V_{xz}$ and $V_{zx}$ are found using Equation (24). In particular, Equation (24) can be written for each transmitter-receiver pair. The two resulting equations can be solved to yield:

$$V_{xz}^{(1)} = -\frac{(C_{1c}^{(1)}\sin(\theta_T^{(2)}) - C_{1c}^{(2)}\sin(\theta_T^{(1)})/g_2)\cos(\phi_B) +}{\sin(\theta_R)\sin(\theta_T^{(1)} - \theta_T^{(2)})} \tag{48}$$
$$\frac{(C_{1s}^{(1)}\sin(\theta_T^{(2)}) - C_{1s}^{(2)}\sin(\theta_T^{(1)})/g_2)\sin(\phi_B)}{\sin(\theta_R)\sin(\theta_T^{(1)} - \theta_T^{(2)})};$$

$$V_{zx}^{(1)} = \frac{(C_{1c}^{(1)}\cos(\theta_T^{(2)}) - C_{1c}^{(2)}\cos(\theta_T^{(1)})/g_2)\cos(\phi_B) +}{\cos(\theta_R)\sin(\theta_T^{(1)} - \theta_T^{(2)})} \tag{49}$$
$$\frac{(C_{1s}^{(1)}\cos(\theta_T^{(2)}) - C_{1s}^{(2)}\cos(\theta_T^{(1)})/g_2)\sin(\phi_B)}{\cos(\theta_R)\sin(\theta_T^{(1)} - \theta_T^{(2)})};$$

As can be seen from Equations (48) and (49), when both transmitter azimuth angles are zero with respect to the receiver, the tilt angles of the transmitters with respect to the tool axis must be different.

The gain correction and bedding orientation angle obtained above may be used to obtain certain coupling components using the $0^{th}$ order harmonic coefficient equation. The couplings are given by:

$$V_{zz}^{(1)} = \frac{C_0^{(1)}\sin(\theta_T^{(2)})\cos(\phi_T^{(2)}) - C_0^{(2)}\sin(\theta_T^{(1)})\cos(\phi_T^{(1)})/g_2}{\cos(\theta_R)[\cos(\theta_T^{(1)})\sin(\theta_T^{(2)})\cos(\phi_T^{(2)}) - \cos(\theta_T^{(2)})\sin(\theta_T^{(1)})\cos(\phi_T^{(1)})]}; \quad (50)$$

$$V_{xx}^{(1)} + V_{yy}^{(1)} = 2\frac{C_0^{(1)} - V_{zz}^{(1)}\cos(\theta_R)\cos(\theta_T^{(1)})}{\sin(\theta_R)\sin(\theta_T^{(1)})\cos(\phi_T^{(1)})}. \quad (51)$$

Thus, using the above, the solution for the five non-zero components $V_{zz}, V_{xx}, V_{yy}, V_{xz}$, and $V_{zx}$, of the coupling tensor for a planar formation in the rotated coordinate system can be obtained.

In an alternate embodiment of the invention, a response signal can be calculated for a one-transmitter/two-receiver configuration, in which the two receivers are spaced apart. As described above, when using a one-transmitter/one-receiver configuration, certain of the electromagnetic coupling components or combinations of them can be obtained. For the alternate one-transmitter/two-receiver embodiment, a response signal may be defined as a combination of at least one of the electromagnetic coupling components from the transmitter/first receiver pair and at least one of the electromagnetic coupling components from the transmitter/second receiver pair. An example of one such combination is:

$$\frac{V_{zz}^{(1)} + \lambda(V_{xx}^{(1)} - V_{yy}^{(1)})}{V_{zz}^{(2)} + \lambda(V_{xx}^{(2)} - V_{yy}^{(2)})}; \quad (52)$$

where $\lambda$ is a constant, and the superscripts (1) and (2) indicate the electromagnetic coupling components from each of the respective transmitter/receiver pairs.

Figure 4:
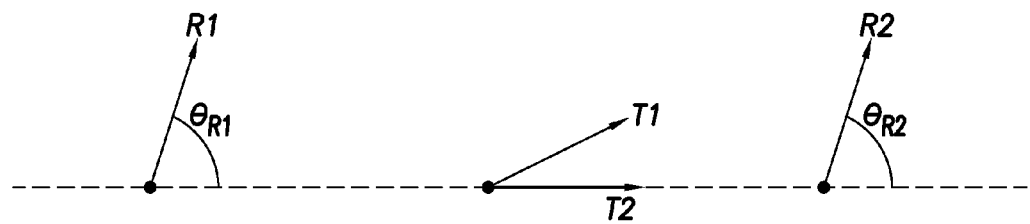
FIG. 4 is a schematic diagram of an exemplary configuration of two transmitters and two receivers in accordance with the present invention.

In yet another embodiment of the invention (FIG. 4), a response signal can be calculated for a two-transmitter and two-receiver configuration, in which the two transmitters are located close to one another or preferably co-located, and the two receivers are spaced apart. Since the electromagnetic coupling components can be obtained for a two-transmitter/one-receiver configuration as described above, a response signal may be defined as a combination of at least one of the electromagnetic coupling components from the two-transmitter/first receiver pair and at least one of the electromagnetic coupling components from the two-transmitter/second receiver pair. An example of one such combination is:

$$\frac{V_{xx}^{(1)}}{V_{xx}^{(2)}}; \quad (53)$$

where the superscripts (1) and (2) indicate the electromagnetic coupling components from each of the respective transmitter/receiver pairs.

From the foregoing detailed description of specific embodiments of the invention, it should be apparent that a novel and useful method for obtaining subsurface formation parameters such as symmetrized and anti-symmetrized responses using a single tilted transmitter-receiver pair has been disclosed. In addition, various embodiments that exploit the symmetry inherent to planar formations have been disclosed, both for a single TR pair and for a two-transmitter-one receiver configuration. By reciprocity the roles of transmitters and receivers can be reversed such that, for example, a two-receiver-one transmitter configuration could also be used. Although specific embodiments of the invention have been disclosed herein in some detail, this has been done solely for the purposes of describing various features and aspects of the invention, and is not intended to be limiting with respect to the scope of the invention. It is contemplated that various substitutions, alterations, and/or modifications, including but not limited to those implementation variations which may have been suggested herein, may be made to the disclosed embodiments without departing from the scope of the invention as defined by the appended claims.

What is claimed is:

1. A method to determine one or more parameters of a formation traversed by a borehole, comprising:
   disposing a tool in the borehole, wherein at least a portion of the formation traversed by the borehole has substantially parallel boundaries, and further wherein the tool includes a first transmitter having a transmitter dipole moment at an angle $\theta_T$ with respect to a longitudinal axis of the tool and a first receiver having a receiver dipole moment at an angle $\theta_R$ with respect to the longitudinal axis of the tool, the first transmitter and the first receiver comprising a first transmitter-receiver pair;
   transmitting an electromagnetic signal from the first transmitter while rotating the tool;
   receiving the electromagnetic signal from the first receiver to produce an electromagnetic formation measurement signal from the first transmitter-receiver pair;
   measuring an azimuth angle of tool rotation; and
   determining the one or more formation parameters for the portion of the formation having substantially parallel boundaries using the electromagnetic formation measurement signal from only the first transmitter-receiver pair in relation to the azimuth angle of tool rotation.

2. The method of claim 1, wherein the one or more parameters include a bedding orientation angle, a horizontal resistivity, a vertical resistivity, a boundary indicator, a distance to bed boundary, one or more electromagnetic coupling components, or a combination of the one or more electromagnetic coupling components.

3. The method of claim 2, wherein the combination of the one or more electromagnetic coupling components includes a symmetrized response or an anti-symmetrized response.

4. The method of claim 1, wherein the transmitter and the receiver operate in a reciprocal manner.

5. The method of claim 1, wherein the transmitter dipole moment and the receiver dipole moment are tilted with respect to the longitudinal axis of the tool.

6. The method of claim 1, wherein one and only one of the transmitter and receiver dipole moments is parallel with the longitudinal axis of the tool.

7. The method of claim 1, wherein one and only one of the transmitter and receiver dipole moments is perpendicular to the longitudinal axis of the tool.

8. The method of claim 1, wherein $\theta_T$ and $\theta_R$ are equal.

9. The method of claim 1, wherein an azimuth angle $\theta_T$ between the transmitter and the receiver is nonzero.

10. The method of claim 9, wherein the transmitter dipole moment and the receiver dipole moment are in orthogonal planes.

11. The method of claim 1, wherein the determining comprises using harmonic coefficients to compute the parameters.

12. The method of claim 1, wherein the determining comprises using harmonic coefficients to compute one or more electromagnetic coupling components or a combination of one or more electromagnetic coupling components; and using the one or more electromagnetic coupling components or the combination of one or more electromagnetic coupling components to compute one or more formation properties.

13. The method of claim 1, wherein the transmitter is carried on or within a first module of the tool and the receiver is carried on or within a second module of the tool, wherein the first and second modules are removeably joined to one another or to an intervening module or set of modules.

14. The method of claim 1, further comprising using one or more components of the electromagnetic coupling tensor, or a combination of those components, to determine a bedding orientation angle, a horizontal resistivity, a vertical resistivity, a boundary indicator, a distance to bed boundary, and/or a combination of the one or more electromagnetic coupling components.

15. The method of claim 1, wherein the transmitter dipole moment and the receiver dipole moment are in the same plane.

16. The method of claim 1, wherein the measured signal is a complex voltage.

17. The method of claim 1, wherein the one or more parameters include a ratio of electromagnetic coupling components.

18. The method of claim 17, wherein the ratio is unitless.

19. A tool configured to be disposed in a borehole penetrating a formation, at least a portion of the formation having substantially parallel boundaries, the tool being one of one or more tools making up a bottom hole assembly of a drill string, the tool comprising:

a single transmitter having a transmitter dipole moment at an angle $\theta_T$ with respect to a longitudinal axis of the tool;

a single receiver having a receiver dipole moment at an angle $\theta_R$ with respect to the longitudinal axis of the tool; and a rotational position measurement device carried on or within the tool;

wherein the transmitter and the receiver form a transmitter-receiver pair that is the only transmitter-receiver pair of the tool, wherein the transmitter-receiver pair is configured to obtain a measured signal configured to enable, when combined with a rotation position measurement obtained by the rotational position measurement device, a determination of one or more parameters of the portion of the formation having substantially parallel boundaries.

20. The tool of claim 19, wherein $\theta_T$ and $\theta_R$ are equal.

21. The tool of claim 19, wherein the transmitter dipole moment and the receiver dipole moment are in different planes.

22. The tool of claim 21, wherein the different planes are orthogonal.

23. The tool of claim 19, wherein the transmitter and the receiver operate in a reciprocal manner.

24. The tool of claim 19, wherein one and only one of the transmitter and receiver dipole moments is parallel with the longitudinal axis of the tool.

25. The tool of claim 19, wherein one and only one of the transmitter and receiver dipole moments is perpendicular to the longitudinal axis of the tool.

26. The tool of claim 19, wherein the transmitter is carried on or within a first module of the tool and the receiver is carried on or within a second module of the tool, wherein the first and second modules are removeably joined to one another or to an intervening module or set of modules.

27. A tool configured to be disposed in a borehole penetrating a formation, at least a portion of the formation having substantially parallel boundaries, the tool being one of one or more tools making up a bottom hole assembly of a drill string, the tool comprising:

a first transmitter having a first transmitter dipole moment at an angle $\theta_{T1}$ with respect to a longitudinal axis of the tool;

a second transmitter having a second transmitter dipole moment at an angle $\theta_{T2}$ with respect to the longitudinal axis of the tool;

a single receiver having a receiver dipole moment at an angle $\theta_R$ with respect to the longitudinal axis of the tool, wherein at least one of $\theta_{T1}$ and $\theta_{T2}$ is equal to $\theta_R$; and a rotational position measurement device carried on or within the tool;

wherein the tool comprises exactly two transmitters and exactly one receiver, the exactly two transmitters consisting of the first transmitter and the second transmitter, and the exactly one receiver consisting of the single receiver.

28. The tool of claim 27, wherein at least one of the first and second transmitter dipole moments is in a first plane, the receiver dipole moment is in a second plane, and the first and second planes are different.

29. The tool of claim 28, wherein the first and second planes are orthogonal.

30. The tool of claim 27, wherein the transmitters and the receiver operate in a reciprocal manner.

31. The tool of claim 27, wherein one and only one of the transmitter and receiver dipole moments is parallel with the longitudinal axis of the tool.

32. The tool of claim 27, wherein one and only one of the transmitter and receiver dipole moments is perpendicular to the longitudinal axis of the tool.

33. The method of claim 27, wherein the first transmitter is carried on or within a first module of the tool, the second transmitter is carried on or within a second module of the tool, and the receiver is carried on or within a third module of the tool, wherein the first, second, and third modules are removeably joined to one another or to an intervening module or set of modules.

* * * * *